United States Patent
Florschuetz et al.

(10) Patent No.: US 9,582,818 B2
(45) Date of Patent: Feb. 28, 2017

(54) INTERACTIVE GRAPHICAL INTERFACE INCLUDING A STREAMING MEDIA COMPONENT AND METHOD AND SYSTEM OF PRODUCING THE SAME

(75) Inventors: Alan Scott Florschuetz, Allen, TX (US); Christopher J. Manchini, Plano, TX (US)

(73) Assignee: YAHOO! INC., Sunnyvale, CA (US)

( * ) Notice: Subject to any disclaimer, the term of this patent is extended or adjusted under 35 U.S.C. 154(b) by 914 days.

(21) Appl. No.: 13/211,833

(22) Filed: Aug. 17, 2011

(65) Prior Publication Data
US 2012/0036027 A1 Feb. 9, 2012

Related U.S. Application Data

(63) Continuation of application No. 10/782,466, filed on Feb. 19, 2004, now Pat. No. 8,028,233.

(60) Provisional application No. 60/467,447, filed on May 2, 2003.

(51) Int. Cl.
G06F 3/00 (2006.01)
G06Q 30/02 (2012.01)
G06F 9/44 (2006.01)

(52) U.S. Cl.
CPC ........... *G06Q 30/0277* (2013.01); *G06F 8/38* (2013.01)

(58) Field of Classification Search
CPC ............. G06Q 30/0277; H04N 21/812; H04N 21/4316
See application file for complete search history.

(56) References Cited

U.S. PATENT DOCUMENTS

| | | | |
|---|---|---|---|
| 6,535,888 B1 * | 3/2003 | Vijayan et al. | 707/706 |
| 6,925,496 B1 * | 8/2005 | Ingram | G06F 17/30899 |
| | | | 707/E17.119 |
| 2001/0029538 A1 * | 10/2001 | Blockton et al. | 709/226 |
| 2002/0161909 A1 * | 10/2002 | White | G06F 17/30882 |
| | | | 709/231 |
| 2003/0222907 A1 * | 12/2003 | Heikes et al. | 345/745 |

* cited by examiner

*Primary Examiner* — Omar Abdul-Ali
(74) *Attorney, Agent, or Firm* — James J. DeCarlo; Greenberg Traurig LLP

(57) ABSTRACT

A multiphase interactive advertisement includes a first phase having a first graphical interface and a second phase having a second graphical interface including at least a streaming media component space. In an exemplary embodiment, the second phase has a dimension that is greater than a dimension of the first phase. The multiphase interactive advertisement further includes a streaming media component incorporated into the streaming media component space of the second phase. The multiphase interactive advertisement, and specifically, the streaming media component, is generated using a software player engine that includes a core set of player variables and controls.

20 Claims, 13 Drawing Sheets

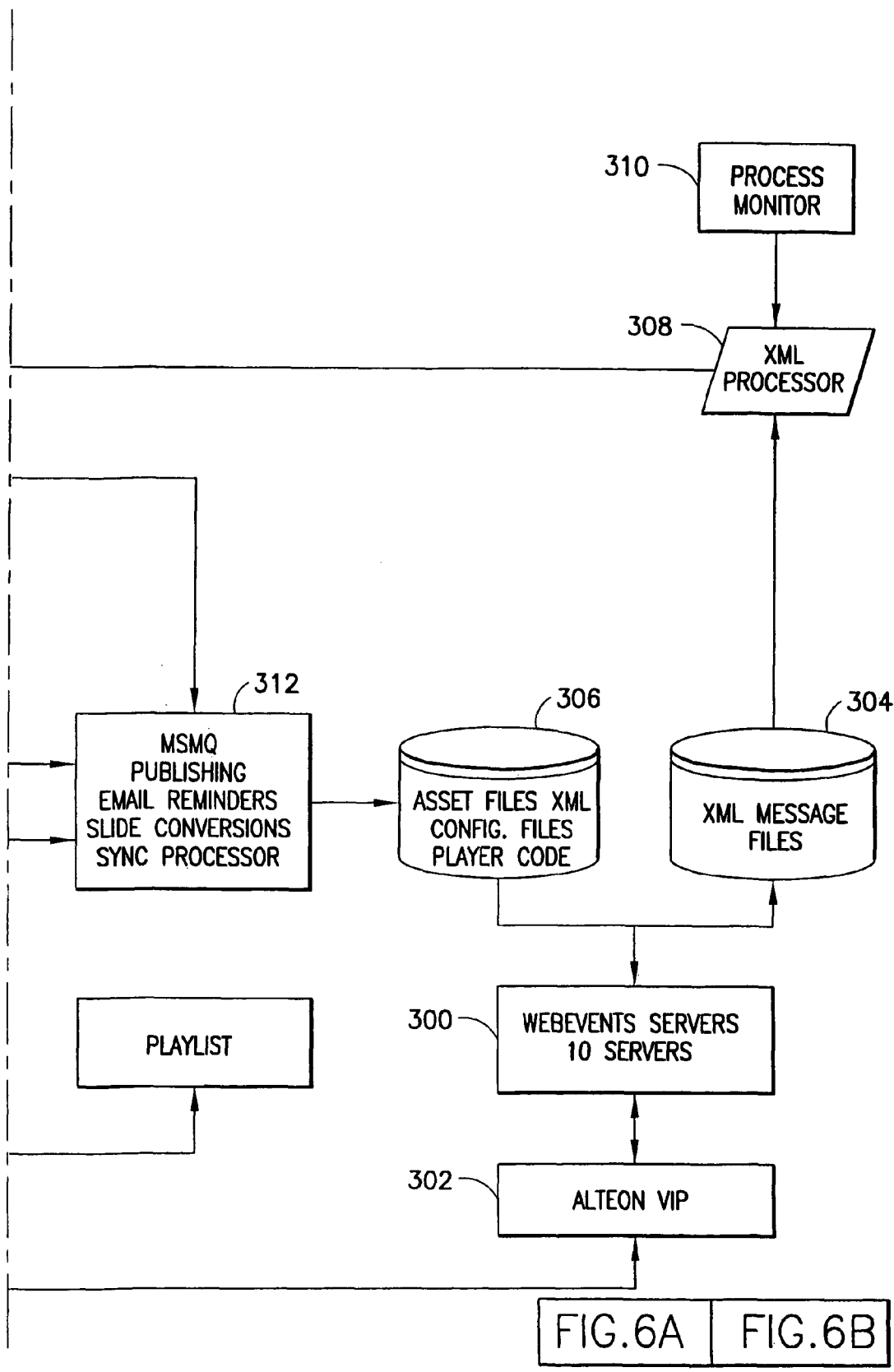

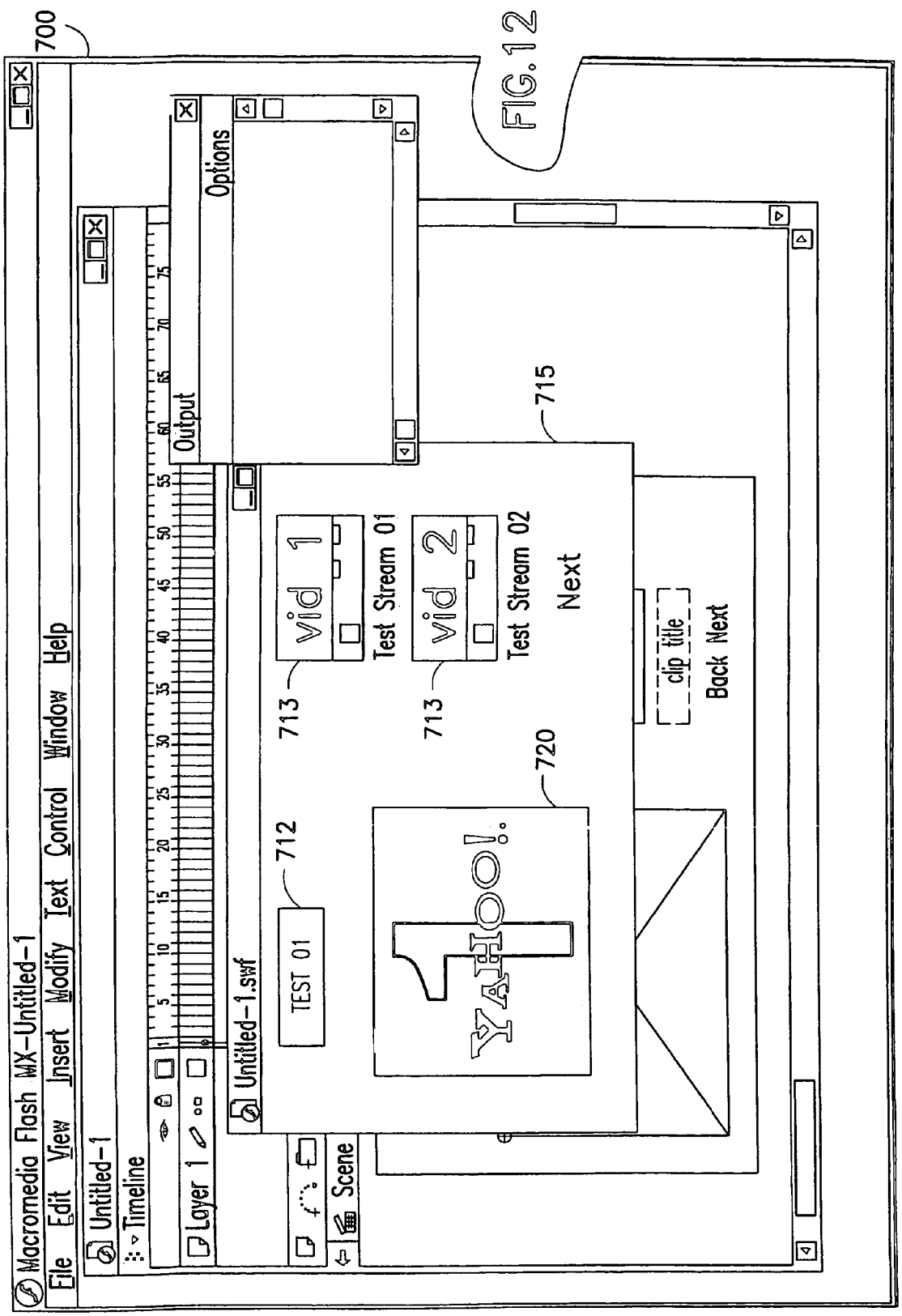

INTERACTIVE GRAPHICAL INTERFACE INCLUDING A STREAMING MEDIA COMPONENT AND METHOD AND SYSTEM OF PRODUCING THE SAME

CROSS-REFERENCE TO RELATED APPLICATIONS

This application is a continuation of and claims the benefit of U.S. patent application Ser. No. 10/782,466, filed Feb. 19, 2004, entitled "Interactive Graphical Interface Including a Streaming Media Component and Method and System of Producing the Same" under 35 U.S.C. §120, which claims priority under 35 U.S.C. §119(e) to U.S. Provisional Patent Application Ser. No. 60/467,447, filed on May 2, 2003, the entire disclosure of which is incorporated by reference.

FIELD OF THE INVENTION

The present invention relates to the field of streaming media and, in particular, to a system and method for displaying an interactive graphical interface to an end user that includes a streaming media component.

BACKGROUND OF THE INVENTION

The banner ad is one of the most prevalent forms of Internet advertising today. Depending on the message, banner ads come in many shapes and sizes. As the Internet has matured, companies have had to balance the use of web page space between content, which is ultimately why a user goes to a particular web site, and advertising, which is one of the primary sources of revenue for Internet companies.

Because space for both content and advertising on a highly trafficked web site such as Yahoo!'s home page is very valuable, using as little space as possible is very advantageous. Thus, there is a desire in the Internet advertising industry to maximize use of space on a web page so as to fit as much content and advertisements as possible while maintaining a clean and attractive look and feel of the web page.

Moreover, it is desirable to provide interactive advertising that permits a user to interact with one or more features of the advertisement, which has an added benefit of focusing the user's attention on the advertisement. One way to make and Internet advertisement interactive is to add vectored graphics and/or streaming media (e.g., streaming audio or video) to the advertisement. By way of background, Macromedia Flash is one type of cross-platform compatible vector-based graphic animation tool. Vector-based images, which are also referred to as object-oriented graphics, use geometrical formulas to represent images. Vector-oriented images are more flexible than other types of images, such as bit maps, because they can be resized and stretched. Presently, although vector-based graphic animation tool, such as Macromedia Flash, provide the capability to embed streaming media elements, these tools have very rudimentary streaming media player capabilities.

Thus, in order to provide streaming media capabilities in a vector-based graphic player, a customized player must be specifically developed and hard-coded for a particular application. Such hard-coded players lack the ability to be reused for subsequent purposes and must be at least partially recoded in the event the streaming content is changed. Moreover, because such players are typically built on a "one-off" basis, the players lack the ability to integrate with existing streaming media administration and development tools. Thus, there is a need and desire to for a system that provides core streaming media player functions and controls in a vector-based graphic animation environment.

SUMMARY OF THE INVENTION

The foregoing as well as other needs are satisfied by the present invention. In an exemplary embodiment, a method of creating a multiphase advertisement including a media component comprises generating a first phase of the multiphase advertisement, the first phase including at least a graphical interface; generating a second phase of the multiphase advertisement, wherein the second phase has a dimension greater than a dimension of the first phase, the second phase including a streaming media component space; building a streaming media component using a software player engine, the player engine including at least a set of media player variables and a set of media player controls, the streaming media component including a link to streaming media content; incorporating the streaming media component into the streaming media component player space of the second phase of the multiphase advertisement; and displaying the multiphase advertisement on a web page.

In an exemplary embodiment, a multiphase interactive advertisement comprises a first phase having a first graphical interface; a second phase having a second graphical interface including at least a streaming media component space, the second phase having a dimension that is greater than a dimension of the first phase; and a streaming media component incorporated into the streaming media component space of the second phase. The second phase of the multiphase interactive advertisement is triggered by an action performed on the first phase of the multiphase interactive advertisement.

Other features of the present invention will become apparent from the following detailed description, considered in conjunction with the accompanying drawing figures. It is to be understood, however, that the drawings are designed solely for the purpose of illustration and not as a definition of the limits of the invention, for which reference should be made to the appended claims. Further, it will be clear to those of skill in the art that various modifications, additions, and subtractions can be made without departing from the spirit or scope of the claims.

BRIEF DESCRIPTION OF THE FIGURES

In the drawing figures, which are merely illustrative, and wherein like reference characters denote similar elements throughout the several views:

FIGS. 6*a* and 6*b* are schematic overviews of a system for delivering streaming media to a multiphase advertisement; and FIGS. 7-12 depict a user interface of a vector-based graphics application for generating the multiphase advertisement of the present invention.

DETAILED DESCRIPTION OF THE EXEMPLARY EMBODIMENTS

The present application relates to an interactive graphical interface incorporating a streaming media component, as illustrated by FIGS. 1-12, and a player engine for producing the same.

According to an exemplary embodiment shown in FIGS. 1-5, an interactive graphical interface 100 may be displayed as a portion of an HTML web page 20 using Macromedia's Flash Player. The interactive graphical interface 100 may also be displayed as a separate window on a user's desktop. Although not necessary, in many instances, the display of the interactive graphical interface 100 will have two or more display phases, which may be triggered automatically or in response to user input. For example, in FIG. 1, an initial display phase 102 of the interactive graphical interface 100 takes the form of a traditional banner advertisement. In the initial display phase 102, the interactive graphical interface 100 uses as little space on the web page 20 as possible. It should be understood, however, that the size and location of the interactive graphical interface 100 is a matter of design choice.

Typically, the interactive graphical interface 100 is displayed to an end user as part of a web page 20 displayable in an Internet browser 10, such as Microsoft Internet Explorer or Netscape Navigator. In general, the interactive graphical interface 100 is controlled in a client-server environment. Preferably, using thin-client technologies, such as for example Macromedia Flash technology, a significant portion of the processing required to provide the desired functionality to the interactive graphical interface 100 can be performed at the client-side on a personal computer, tablet pc, personal digital assistant (PDA), WAP-enabled mobile device, or other computer device having a display. Server-side components, such as streaming media clip files, are served to the interactive graphical interface 100 on the client-side on demand so as to minimize bandwidth overhead. In other words, large streaming media files need not be downloaded to the client-side until needed in response to user action or other triggering events.

Although it is not possible to depict in static figures, the interactive graphical interface 100 may have an animated component to it, although this feature is not necessary. For instance, in the exemplary embodiment described herein, a vector based graphics engine, such as for example Macromedia Flash technology, may be used to provide vector-based animated graphics, as described further below. By way of example only, Macromedia Flash technology permits the design of graphical displays that include moving, timed, or animated components. At least a portion 105 of the initial display phase 102 of the interactive graphical interface 100 is responsive to a user input, such as a mouse click or mouse over.

Figure 1:
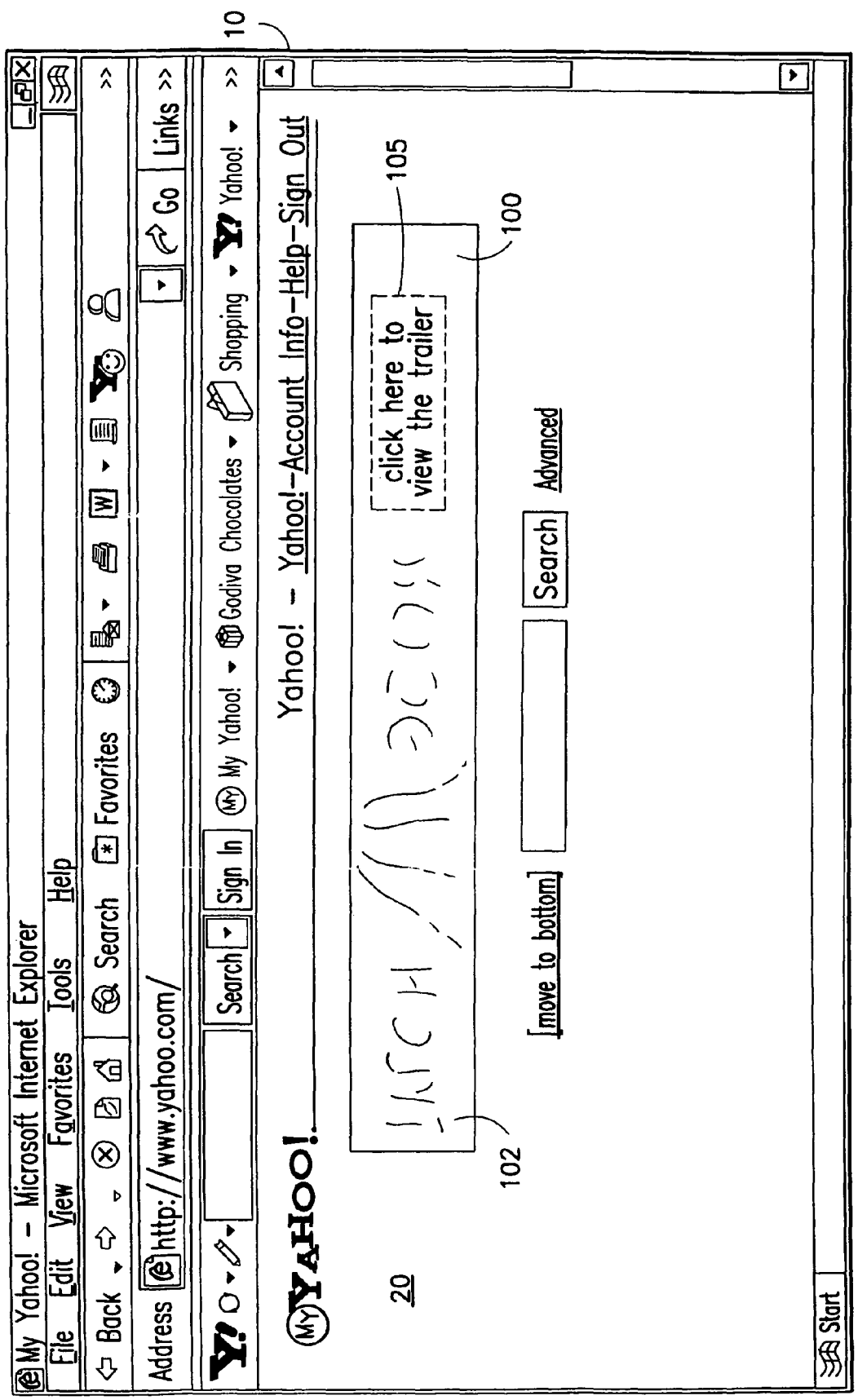
FIG. 1 is a screen shot depicting a first phase of a multiphase advertisement.
Figure 2:
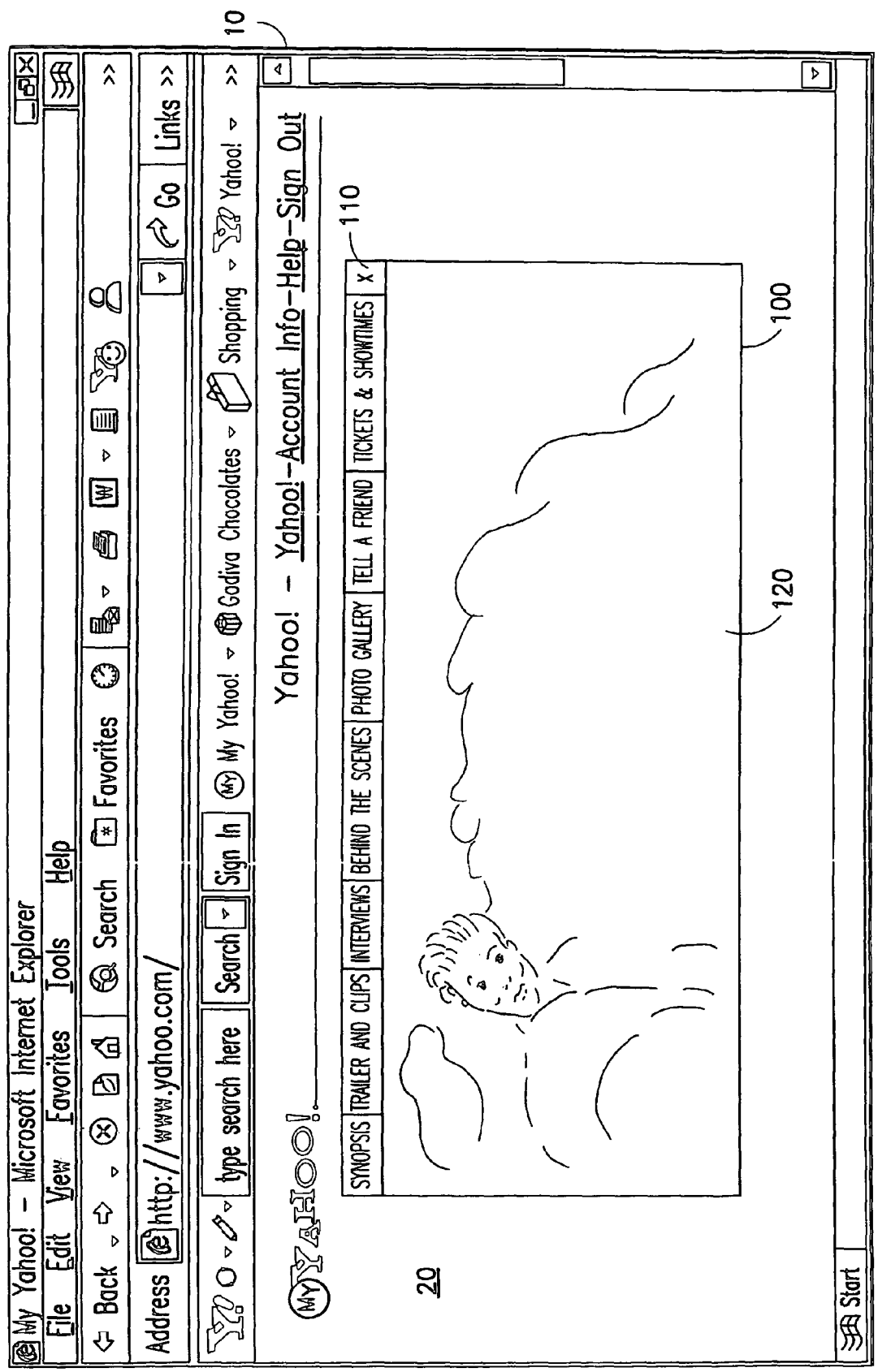
FIG. 2 is a screen shot depicting a second phase of multiphase advertisement.

In the example shown in FIG. 1, a user would click on the text "click here to view the trailer". The user input, in this case a mouse click, triggers a second display phase 120' of the interactive graphical interface 100' as shown in FIG. 2. The second display phase 120' may be an expanded display to permit additional features and interactive options to be displayed in the interactive graphical interface 100' window. As shown in FIG. 2, the interactive graphical interface 100' may include a toolbar 110' with which the user can access various functionalities of the interactive graphical interface 100'. In the example shown in FIG. 2, the interactive graphical interface 100' is an interactive advertisement for a new movie to be released. Thus, the toolbar 110' may provide the user access to summary information concerning the movie, information and pictures of the cast, the movie trailer, and an ability to purchase movie tickets. In alternate embodiments, for example advertisements for particular consumer goods, the interactive graphical interface 100' could provide the user with the functionality to purchase the consumer good being advertised.

An advantage of the multiphase interactive graphical interface 100, 100' is that it permits a highly interactive, multimedia interface that can be used to sell goods and services and/or serve as an advertising platform while being non-intrusive and using as small amount of space as is possible. Because space on a highly trafficked web site such as Yahoo!'s home page is very valuable, using as little space as possible is very advantageous. Thus, an objective of the present invention is to maximize use of that space so as to fit as much content and advertisements as possible while maintaining the clean and attractive look and feel of the web page. However, when a user moves their cursor over the ad, or clicks on a feature of the ad, the ad will change, preferably enlarge, so as to more firmly grab the user's attention.

Figure 3:
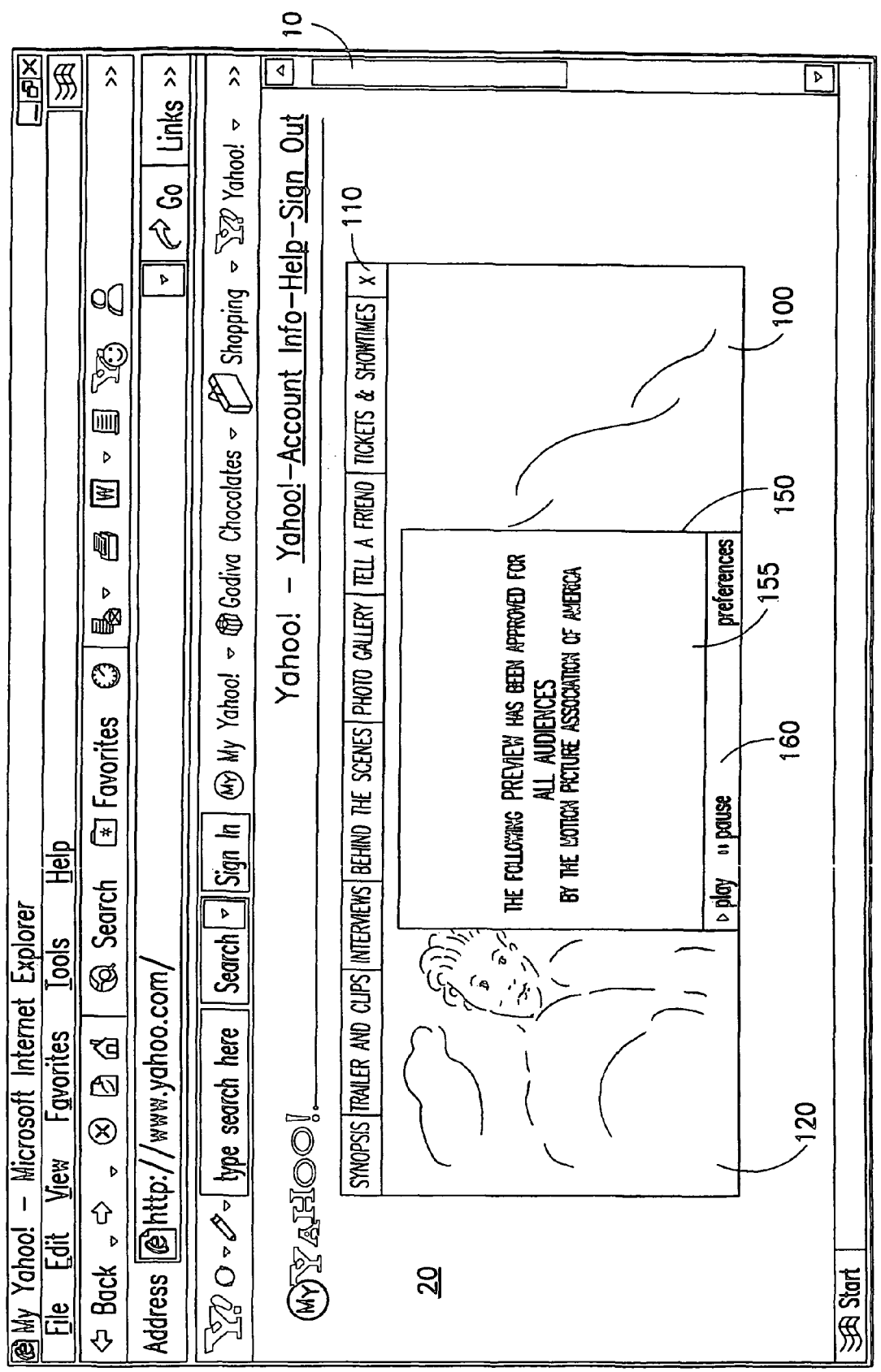
FIG. 3 is a screen shot depicting a streaming media component of a second phase of a multiphase advertisement.

As discussed above in connection with FIG. 2, one feature of the interactive graphical interface 100' is to provide the user with the ability to view video related to the subject of the interactive graphical interface 100. In the example described herein, the interactive graphical interface 100 includes an embedded streaming media component 150 that provides the user with the ability to view trailers or other video clips related to the movie or cast. As shown in FIG. 3, an embedded streaming media component 150 of the interactive graphical interface 100 may either automatically play in response to the user triggered second display phase 120, or may play in response to the user triggering the streaming media component 150 from the toolbar. In either case, a streaming media window 155 is displayed on the interactive graphical interface 100, along with a streaming media player toolbar 160. Streaming media content is delivered to and displayed in the streaming media window 155. The streaming media player toolbar 160 provides the user with functionality to control the play of the streaming media, such as to pause the video, restart play of the video, select the size of the streaming window, select the preferred bandwidth of the stream, and the like.

Figure 4:
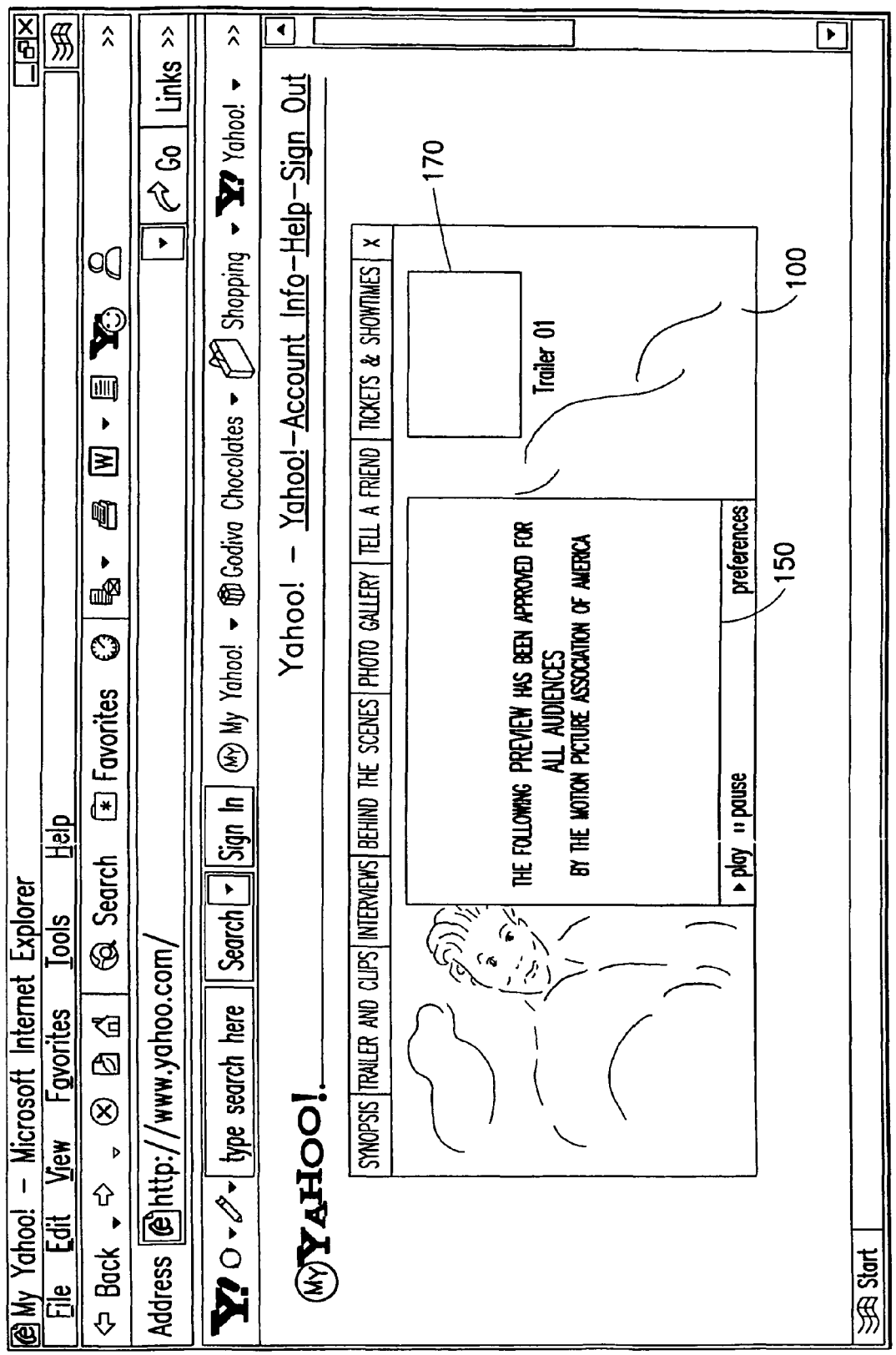
FIG. 4 is a screen shot depicting a streaming media component of a second phase of a multiphase advertisement.

As shown in FIG. 4, the interactive graphical interface 100 may include more than a single streaming media clip. The interactive graphical interface 100 preferably displays a thumbnail 170 of the streaming media clip to facilitate selection of the clip by the user. The thumbnail contains a link to the streaming media servers on the server-side and an identifier of the clip ID.

Figure 5:
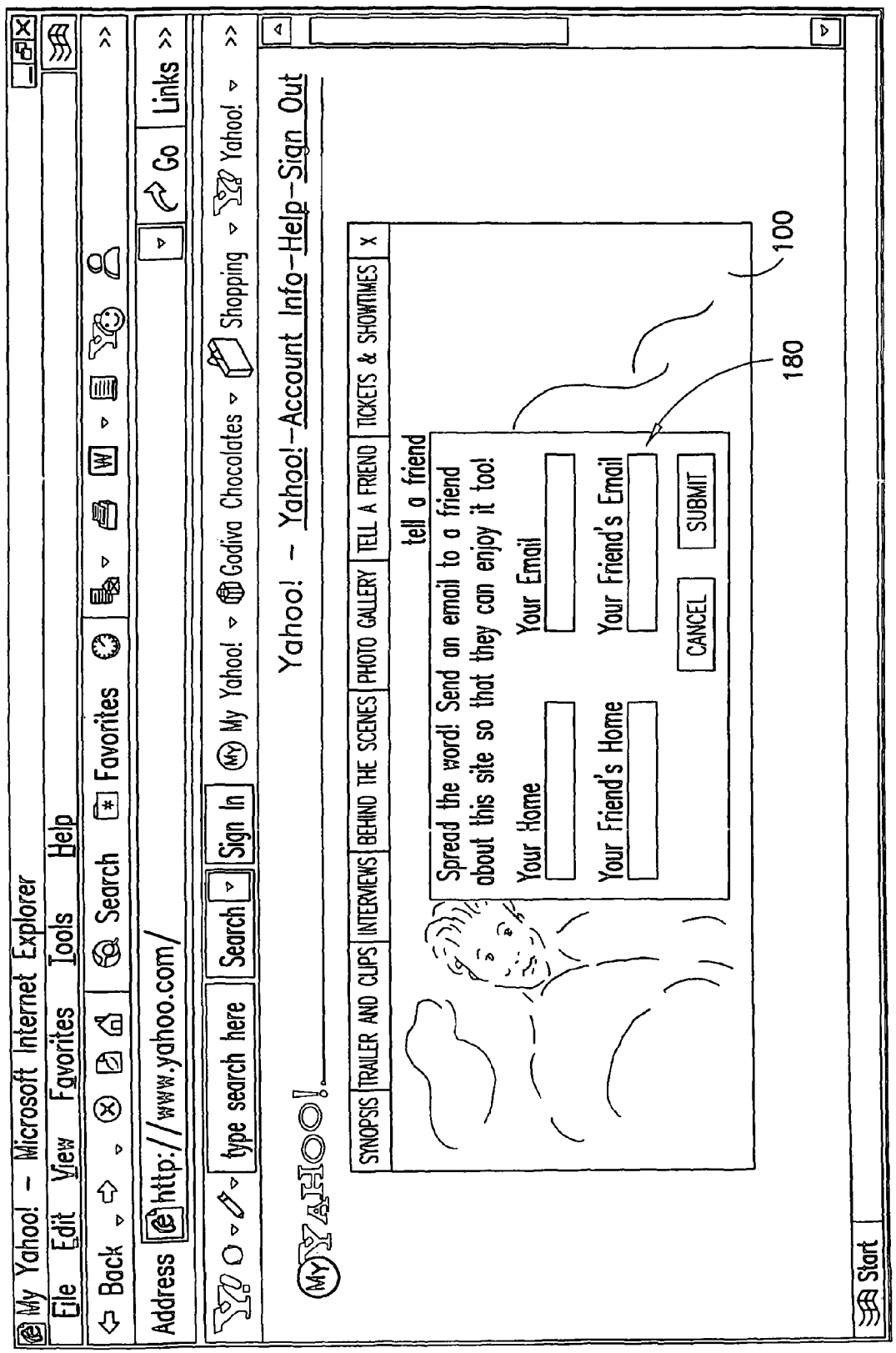
FIG. 5 is a screen shot depicting a streaming media component of a second phase of a multiphase advertisement.

FIG. 5 illustrates additional functionality of the interactive graphical interface 100 whereby an end user can send an e-mail about the subject of the interactive graphical interface to a friend. In the example of FIG. 5 an input form component 180 is displayed, which permits the end user to enter a name and e-mail address to send information about the interface or the information contained therein.

In an exemplary embodiment, the interactive graphical interface is created using a vector-based graphics development tool, such as by way of example only the Macromedia Flash development application. By way of background, Macromedia Flash is a cross-platform compatible vector-based graphic animation tool. Vector-based images, which are also referred to as object-oriented graphics, use geometrical formulas to represent images. Vector-oriented images are more flexible than other types of images, such as bit maps, because they can be resized and stretched. Presently, although Macromedia Flash provides the capability to embed streaming media elements in the Flash player, Macromedia Flash has very rudimentary streaming media player capabilities. Thus, in order to provide streaming media capabilities in a Flash player, a customized player must be specifically developed and hard-coded for a particular application. Such players lack the ability to be reused for subsequent purposes and must be at least partially recoded in the event the streaming content is changed. Moreover, because such players are typically built on a "one-off" basis, the players lack the ability to integrate with existing streaming media administration and development tools.

Thus, in order to more efficiently create an interactive graphical interface that includes an embedded streaming media component, such as is shown in FIGS. 1-5, a player engine provides comprehensive player functionalities to facilitate the creation of a customized interactive graphical interface by providing tools to permit specification of particular stream clips to be delivered to the end user and integrates with existing streaming media content administration and development tools. The player engine comprises a player engine object, which is a transparent layer object that will act as a central player engine and data transport from the interactive graphical interface player to backend administrative tools. High level functions like the playing of video, video position, audio volume, etc, are preferably all handled via method calls on the player engine object. Data collection and handling also preferably occurs via the player engine object through method calls on the player engine object.

In an exemplary embodiment described in connection with the Macromedia Flash development application, the player engine object is preferably coded using ActionScript, which is a JavaScript compliant programming language native to Macromedia Flash development tools.

Of course persons of skill will recognize that the use of Macromedia Flash technologies, ActionScript, or any other particular vector-based graphics applications is not critical to the invention and any number of known or later developed technologies can be implemented within the intended scope of the present invention.

Because ActionScript is an object-oriented language, an exemplary embodiment of the player engine object will now be described in connection with the player engine objects various properties and methods. Persons of skill will understand that the particular variable names for the properties, methods, and events described below are exemplary only. The player engine object preferably, but not necessarily, includes the following properties:

| PlayerEngine (eventid, vlocX, vlocY, channelbuttons, channelMC) [constructor] | |
|---|---|
| EventId | The EventId is a unique identifier for a particular interactive graphical interface. |
| VlocX | This is the x-coordinate of the streaming video area. |
| VlocY | This is the y-coordinate of the streaming video area. |
| channelbuttons | An array of absolute paths to the channel buttons on the interface. |
| channelMC | An absolute path to the channel clip MC on the interface. |

The following describes various exemplary methods and events controlled by the player engine object:
Video/Audio Control
playVideo(clipID) [method]—the clipID is the unique identifier for the content or streaming video that the user wishes to play. The playVideo method initiates a steam of video. The player engine object will setup the player window, connect to the server, select the correct stream according to an end user bandwidth detection method, such as that disclosed in U.S. Pat. No. 6,601,009, the entire disclosure of which is incorporated herein by reference, and begin playing the selected stream.

on PlayVideo( ) [event]—this is an event that launches each time an active video begins playback.

pauseVideo( ) [method]—if there is a video currently playing, the video will be paused. If the video is currently paused, the video will un-pause and continue to play.

on PauseVideo( ) [event]—event that launches each time an active video is paused.

stopVideo( ) [method]—if there is an active video currently playing or paused, this method will stop the video, and unload the player window.

on StopVideo( ) [event]—event that launches each time an active video's playback is stopped (due to EOF or via user control, but not due to buffering)

setAudioLevel(vLevel) [method]—vLevel—the volume level, mute is 0, full volume is 100. The method sets the volume of the video stream to the level indicated as vLevel. The vLevel is persistent across all new video streams until it is set to a new level. The vLevel defaults to 80 and will reset upon destroying the player event object.

setVidSize(vidX, vidY, vidW, vidH) [method]—
  vidX—this is the X coordinate of the upper left corner of the video window.
  vidY—this is the Y coordinate of the upper left corner of the video window
  vidW—this is the total width of the video window
  vidH—this is the total height of the video window The setVidSize method forces a resize of the video stream window and places it in a given position on the interactive graphical interface.

resetVidSize( ) [method]—this method will reset the video stream to the default size and position initially set for the movie.

getStreamiP( ) [method]—this method will return a string that is the server IP address that the active video is currently streaming from.

BandWidth Control
detectBandWidth( ) [method]—this method forces a bandwidth detection of the end user's network connection. The method saves the detected bandwidth setting in the object property of PlayerEngine.bandWidth.

setBandWidth(bLevel) [method]
  bLevel—the bandwidth level you wish to manually set onto the object. Bandwidth levels are typically 14, 28, 56, 100, 200, 300, 500, 700, and 800 Kbps. The method is used to override the detected bandwidth setting and forces a given bandwidth setting onto the player engine object. This method can be used in a preference window on the interactive graphical interface.

getBandWidth( ) [method]—This method returns an integer that is the current value set in PlayerEngine.bandWidth Channel Control
getChannelList( ) [method]—This method returns an array listing of all active channels created in the administration tool, as described further below, for the eventID.

Referral Control—"Tell A Friend"
tellFriendSubmit(toName, toEmail, fromName, fromEmail) [method]
  toName—this is the name of the person whom the e-mail is addressed to.
  toEmail—this is the e-mail address of the person whom the e-mail is addressed to.

fromName—this is the name of the person whom the e-mail is from.

fromEmail—this is the e-mail address of the person whom the e-mail is from.

This method triggers an e-mail to be sent to a person listed as being from the end user.

tellFriendResponse(success) [event]

success—false for email failure, true for email success.

This is an event trigger after a "tell a friend" e-mail is attempted by the external server.

Shared Objects saveSOProp(name, data) [method]

name—this is the name of the data to be saved.

value—this is the data to be saved.

This method saves a value of data into a location identified as "name" within the engine's master shared object.

loadSOProp(name) [method]

name—this is the name of the data to be retrieved.

This method loads a value of data from a location identified as "name" within the engine's master shared object.

delSOProp(name) [method]

name—this is the name of property to be deleted.

This method deletes the specified property and its associate data from the shared object.

getSOPropList( ) [method]—This method returns an object with properties and values for each named data value that exists in the master shared object.

getSOFreeSpace( ) [method]—This method returns the free amount of space left in the master shared object.

Information Tracing liveTrace(traceLine, [CLEAR]) [method]

traceLine—this is a line of text you want to have appear as a new line in the live trace window CLEAR—set to true to clear out the live trace window This method maintains a visual text display of debug and trace information you may need as you develop the player, since the flash platform provides no reliable method of querying behind-the-scenes data and information in the live environment.

The above-described player engine advantageously permits a designer of a customized interactive graphical interface, such as an advertisement displayed on a web page or a standalone web cast, to efficiently integrate streaming media into the interactive graphical interface and utilize in-house streaming media administration tools to select and create streaming media clips for integration. The following describes an exemplary method of integrating streaming media administration tools, such as those described in International Published Application No. WO 02/065305 A1 to Alan Florschuetz for which the entire disclosure is incorporated herein by reference.

The above-referenced patent publication generally describes a software tool for generating and administering a "web-cast event". A "web-cast event" is generally an interactive, multimedia presentation displayable via public communication networks such as the Internet and World Wide Web. Although a "web-cast event" is in some respects different from production of an interactive graphical interface for display via the Internet or other communication network, the development and administration tools available to upload, manage and serve streaming media content are essentially the same. In this way, existing streaming media development and administration tools can be leveraged across multiple technologies. Below is a general description of an exemplary streaming media development and administration tool and its use in the production of an interactive graphical interface.

Figure 6A:
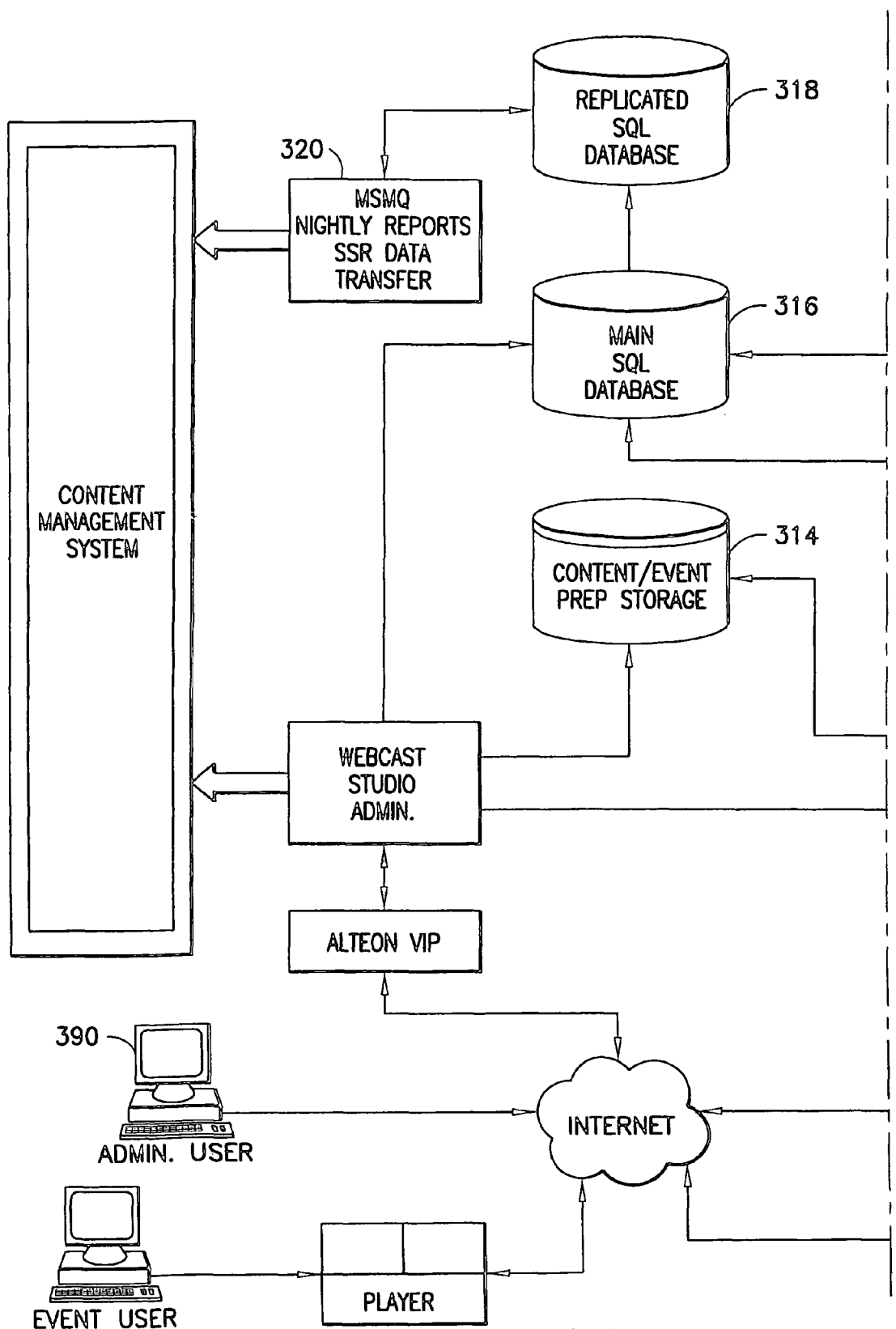

With reference to FIGS. 6a and 6b, an alternate system architecture to the exemplary architecture described in International Published Application No. WO 02/065305 A1 to Alan Florschuetz is shown. Although the basic system flow and architecture remains substantially similar, differences described herein facilitate publication of content to be used in an interactive graphical interface. In the alternate architecture, a primary web-cast event server farm 200 for delivery of the streaming media player utilizes a load balancer 302, such as an Alteon load balancer, with a single virtual IP address, which routes the user to one or more servers as the need for bandwidth requires. These servers are responsible for delivery of all HTML, active server pages (ASP), and Flash .swf files necessary to deliver an event interface depending on the needs of the chosen event interface.

As further disclosed by International Published Application No. WO 02/065305 A1 to Alan Florschuetz, an admin user 390 desiring to produce an interactive graphical interface including an embedded streaming media component accesses production software stored on a server system through the Internet. Using the production software, the admin user 390 is led through a series of steps during which the admin user inputs selects and sets the design properties for various features of the interactive graphical interface. For example, an admin user can include a variety of interactive functional features, including but not limited to flash introductions, pushed or user driven slides, interactive questions, and interactive polls.

At any time during the design process, the admin user 390 can push streaming media or other types of content to the server system to be included in the interactive graphical interface. Content includes various types of media such as, by way of non-limiting example, streaming video or audio, graphical slides, Macromedia® Flash® or Shockwave® content, HTML documents, or other types of web-based content. Any number of different types of interactive features can be included in the production software.

Once the process of selecting the values for the user-perceptible attributes and uploading the streaming media content is completed, the values and corresponding design properties set by the admin user 390 are published to a specialized XML Message File database 304 for secondary processing. By using XML message files to communicate the design properties and streaming media content information, the system realizes increases in capacity and performance due to the elimination of a need for direct database interaction. The files are stored based on their type and priority and are harvested by secondary servers into the database. The types of data include: registration, polling, surveys, questions, and user tracking information.

A primary asset database 306 serves as the main storage component for all event delivery. When events are published from the streaming media content development tool, all associated content is published here including slides images, supporting html files, custom channel pages, and XML configuration files necessary to run the interface.

A secondary server 308 that harvests the stored XML message files from the XML message file database 304 may be provided to permit regulation of the flow of data into the XML message file database 304 and can sustain database outages without impacting the event interface. The secondary server 308 preferably runs several services on an interval basis and to collect the XML files from a directory structure that identifies the types of XML files. Based on the volume and intensity of the XML files, the XML files are opened and the data processed in most cases to the database at different intervals based on priority.

In addition, a process monitor 310 is provided to monitor functions being performed by the secondary server 308 described in the preceding paragraph. One feature of the process monitor 310 is to detect failures in the secondary server 308 and restart the process, if necessary. If repeated failures are detected, the process monitor will broadcast a notice of the failures to administrators.

An Admin Processing Queue 312 may also be provided to handle requests from the Admin tool to take action on an admin user's request that can be handled outside of the admin user's session. By way of example, when a PowerPoint file is uploaded, a message is sent to this queue that indicates the PowerPoint file needs to be converted to individual slide images. The admin user can go on with other development activities while this backend process converts the slides. Once the slides are converted, the .ppt file is activated in the admin. Another example would occur when an admin user directs the system to publish event information. In this case, the Admin processing queue 312 would preferably send a message to handle the copying of the necessary files and publication of the files in XML format, as described above. Yet another example would be the publishing of answered questions for a Q & A portion of a live event. Each time a question is answered in the admin tool, the Admin processing queue 312 publishes an XML file that is used by the front-end servers to display the answered questions. Additional items may include: processing of email reminders that are set up in the admin, nightly report runs and slide sync processing.

Content Prep and Admin Storage 314—This is the storage system to support the admin application and all pre-published content and xml configuration files for event preparation.

Primary Admin Database 316—Stores all processed data to support the admin and data collected during events.

Replicated Database 318—This is a database that is a replication of the live data on a 30-minute delay. This database is used to run ad-hoc reports and nightly report processing to prevent load issues on the live database. This protects the admin and xml harvesting processes.

Extension to Admin Processing Queue 320—This is part of the Admin Processing Queue and is used primarily for nightly reporting runs and data delivery to the Self Serve Reporting system.

Thus, with reference to the preceding disclosure and FIGS. 1-6, an exemplary process for designing and creating an interactive graphical interface 100 with an embedded streaming media component 150 will now be described. Using an event administration tool, various event properties are designed and set by a user. For example, if the interactive graphical interface is a live announcement for a movie premier, the admin user might upload various streaming media clips from the movie, upload various cast images and other content pertaining to the cast, design various end user surveys, and might desire to enable a near "real-time" Q & A environment. An exemplary process and system for designing such events is described in International Published Application No. WO 02/065305 A1.

Once the admin user has completed the design phase, the design properties of the event are published to the XML message database 304. In this way, the event design properties are easily accessible and the XML database 304 essentially functions as a bridge between the backend content databases and servers and the client-side interactive graphical interface. At this point, the interactive graphical interface 100 itself can be produced.

Figure 7:
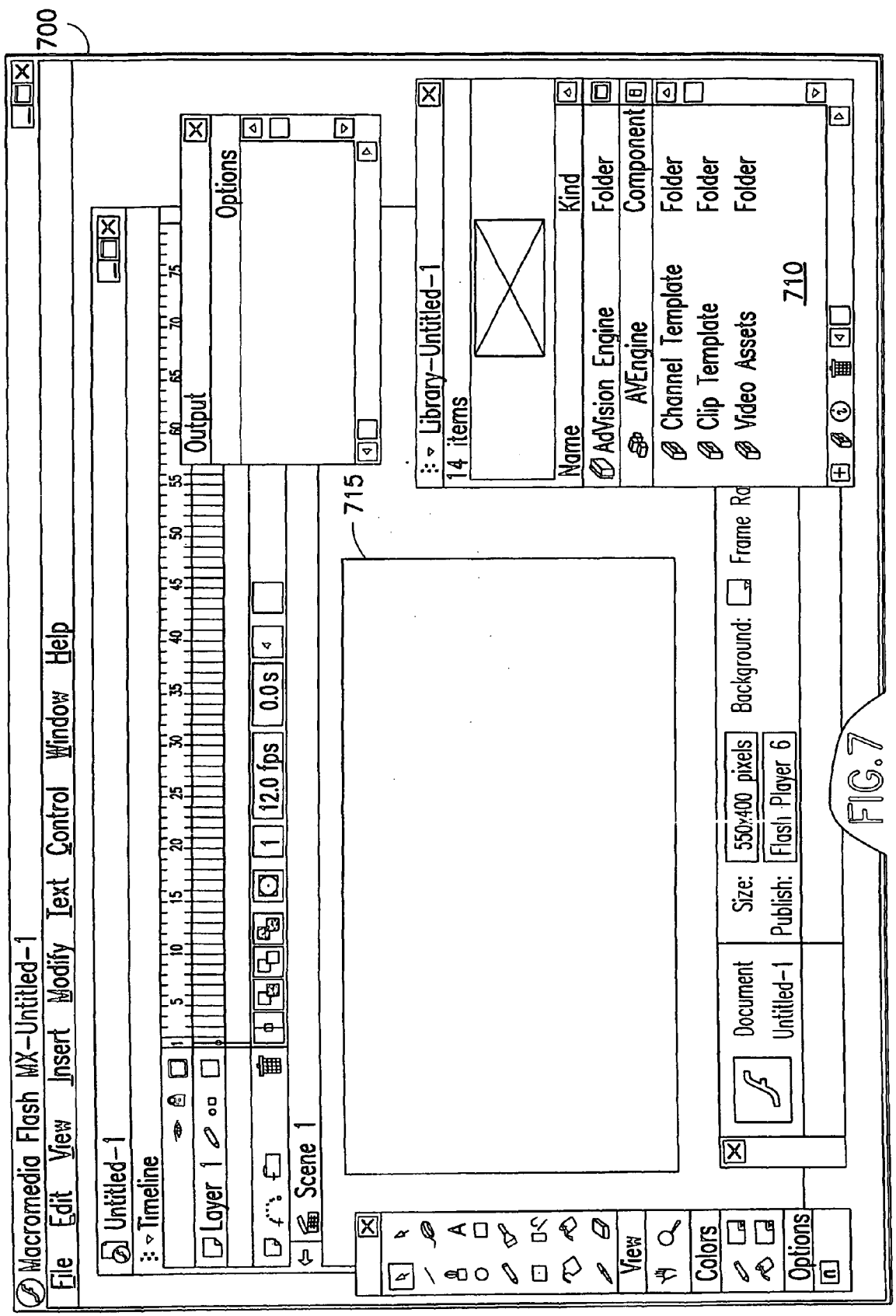
Figure 8:
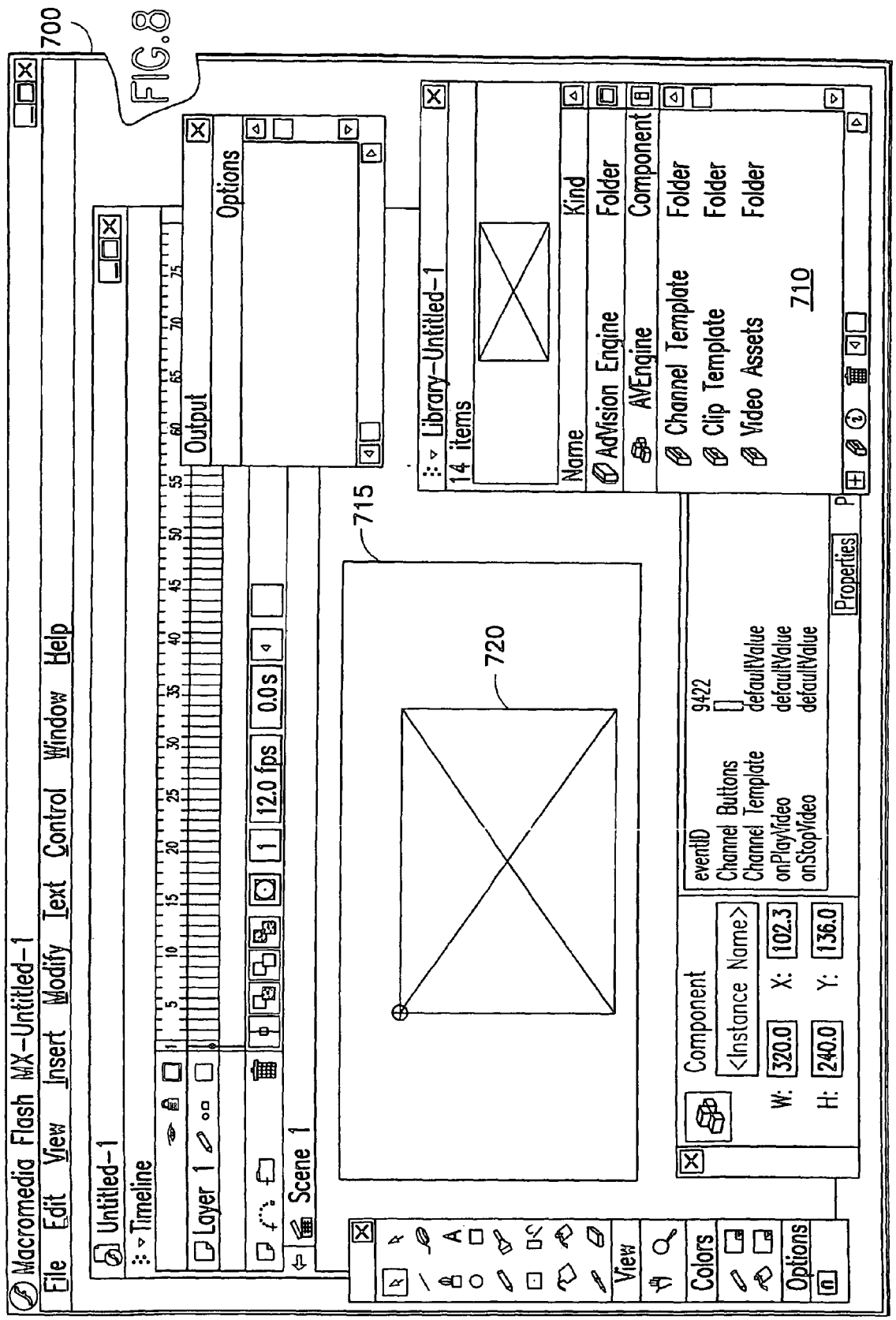
Figure 9:
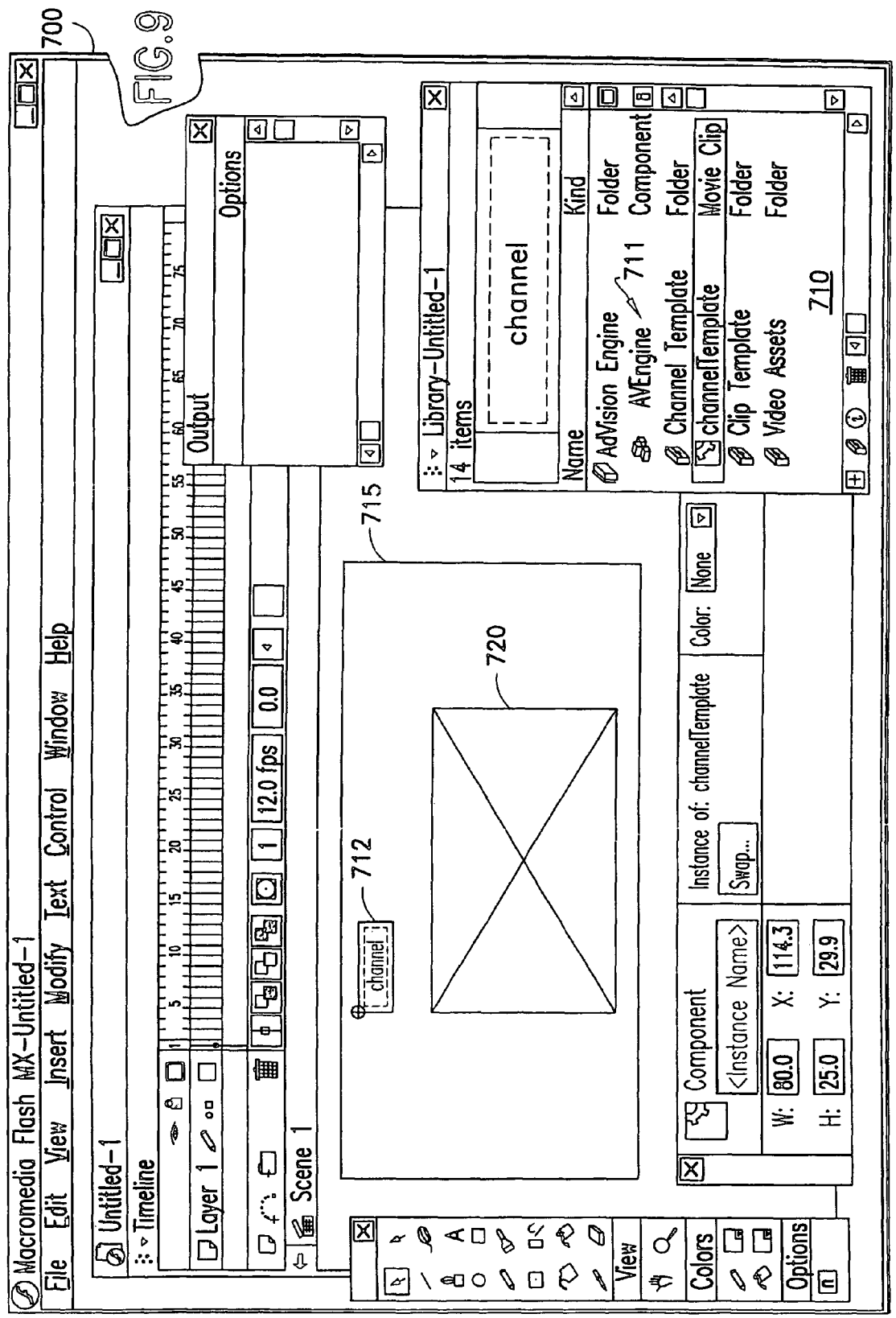

With further reference to FIGS. 7-12, the design process of the interactive graphical interface 100 is shown using the Macromedia Flash development tool 700. In FIGS. 7 and 8, the player engine object 700 is used to create a player component (shown as 720 in FIG. 8) in the Flash player space 715. This player component functions as the engine through which streams are requested from back-end streaming servers and played on the client-side to the end user. In FIG. 9, a channel template portion 712 of the Audio/Visual component 711 is dragged onto the Flash player space. The channel template 712 is populated with channel information from the XML message database at runtime. Using the event properties, such as the eventID, the channel template 712 references a collection of stream clips associated with the eventID. With reference to FIGS. 1-6, toolbar 110, and most specifically the portion of the toolbar that permits an end user to select streaming media components such as the "Trailer and Clips" button, the "Interviews" button, and the "Behind the Scenes" button, permits an end user to select a particular channel and view the clips within that channel. By way of example, the "Interviews" channel may contain one or more streaming clip of various cast members being interviewed about the movie. Similarly, the "Trailers" channel might include one or more of the movie's trailers. The channel template may be modified to have a graphical interface as shown in FIGS. 2-6.

Figure 10:
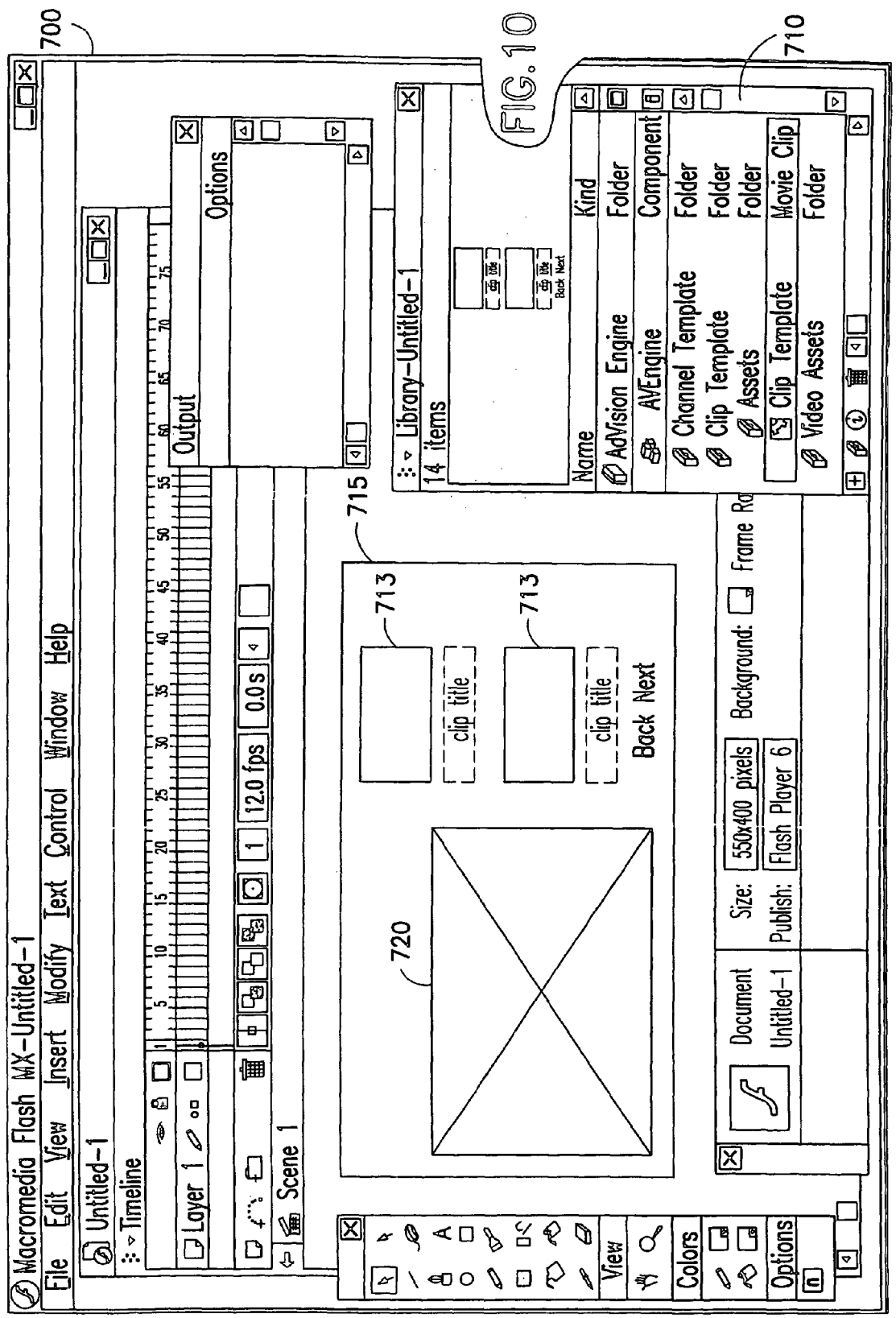

In FIG. 10, one or more clip templates 713 are dragged onto the Flash player space 720. The clip templates 713 will be populated based upon the channel information queried from the XML message database. Like the channel templates 812, the clip templates 713 reference a streaming clip within the selected channel, which is in turn referenced by the eventID.

Figure 11:
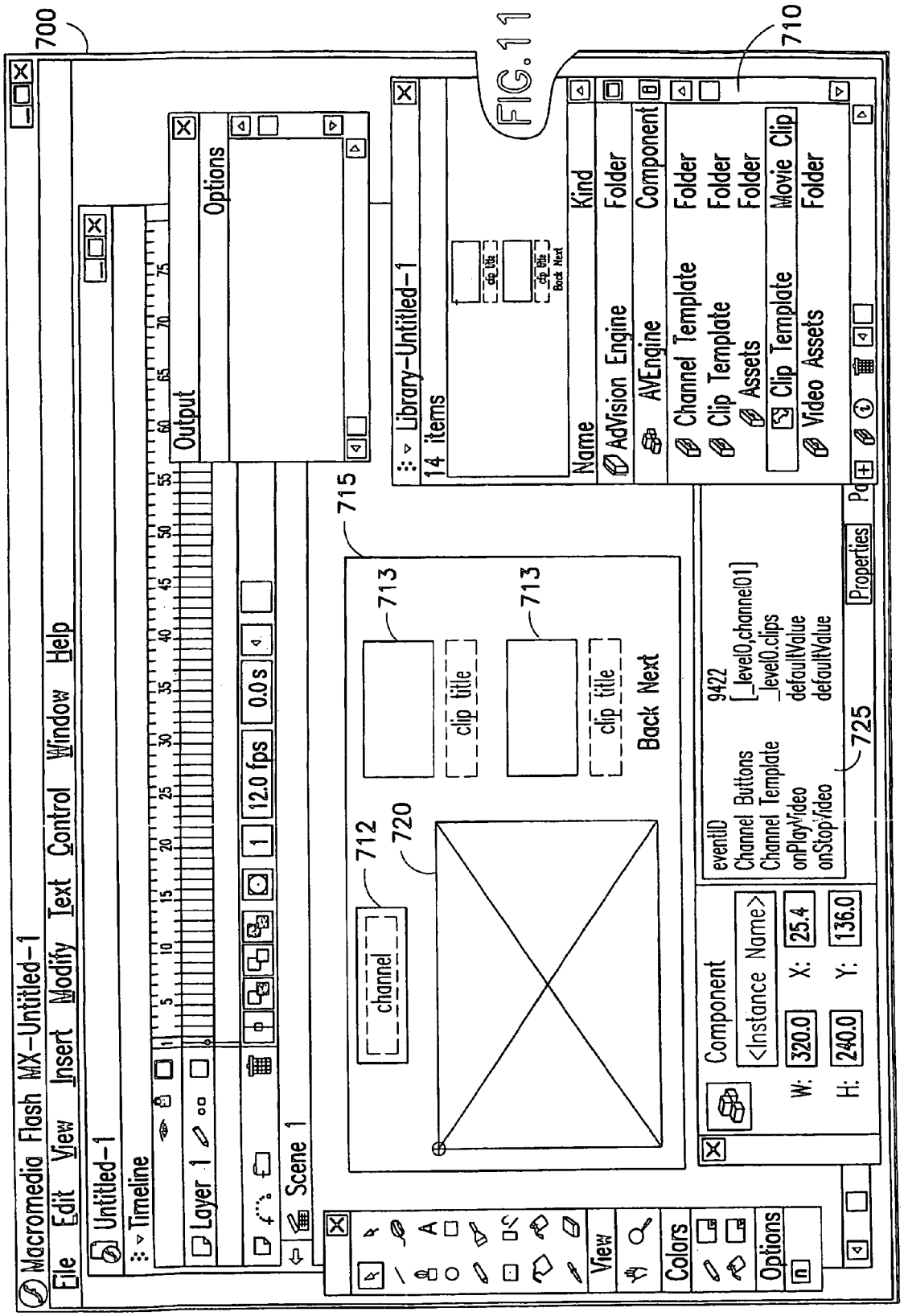

In FIG. 11, the player component properties 725 are set by the administrator. For example, an eventID indicates to the XML message server which event assets are being called by the interactive graphical interface. The channel template 712 and clip template 713 names are also set at this time. Once these properties 725 are set, other features of the interactive graphical interface can be designed in the Flash tool, and the interactive graphical interface can be published to a web site for access by a plurality of end users. The player engine object 710, as described in detail above, includes all of the tools necessary to retrieve, start and operate the streaming media component of the interactive graphical interface. FIG. 12 depicts a stripped down version of an interactive graphical interface playing in the Macromedia development tool.

The following describes how the interactive graphical interface operates to deliver an embedded stream to the end user. By using the toolbar 110, the end user can select to play one or more streaming clips. For example, the end user may select to play the movie trailer. The eventID for the event being displayed by the interactive graphical interface references the group of streaming clips referenced in turn by the channel name. At this point, the player engine may perform bandwidth detection to determine the bit rate of the stream to be pushed to the end user's system. The clip template references one or more streams that have various bit rates to accommodate different user's systems.

Once the player engine determines an appropriate stream bit rate and the clip has been selected by the end user, the player engine makes a stream call to the server-side streaming servers to deliver the requested stream. An exemplary method and system for delivering streams in such a fashion is disclosed by International Publication No. WO 02/057943, the entire disclosure of which is incorporated herein by reference.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

We claim:

1. A method comprising:
    transmitting, by a server computer to a client computer for display, a first phase of a multiphase advertisement, the first phase including a first graphical interface of a first dimension;
    receiving, by the server computer from the client computer, a selection of the first phase of the multiphase advertisement, the receiving of the selection comprising detecting a cursor controlled by the client computer being moved over the first phase of the multiphase advertisement without the need for a cursor activation;
    in response to the detecting of the cursor being moved over the first phase of the multiphase advertisement, transmitting, by the server computer to the client computer for display, a second phase of the multiphase advertisement, the second phase including a second graphical interface of a second dimension that is different from the first dimension of the first phase, the second graphical interface comprising an advertisement for a movie, the second graphical interface comprising an embedded streaming media component that provides a user with an ability to view video clips, the embedded streaming media component automatically playing upon the display of the second phase of the multiphase advertisement,
    the second graphical interface of the second phase including a toolbar, the toolbar enabling the user to access additional information related to the second graphical interface, the additional information comprising showtimes of the movie.

2. The method of claim 1, wherein the toolbar provides the user access to summary information concerning the movie.

3. The method of claim 1, wherein the toolbar provides the user an ability to purchase tickets to the movie.

4. The method of claim 1, wherein the first phase and the second phase of the multiphase advertisement relate to a particular consumer good.

5. The method of claim 4, wherein the toolbar provides the user with functionality to purchase the consumer good.

6. The method of claim 1, wherein the second graphical interface of the second phase comprises a streaming media component.

7. The method of claim 6, wherein the streaming media component is selected from a group of streaming media types consisting of streaming video and streaming audio.

8. The method of claim 1, wherein the first graphical interface is an animated display.

9. The method of claim 1, wherein the toolbar includes at least a link to an interactive form for contacting a second user about a subject of the multiphase advertisement.

10. The method of claim 1, further comprising generating, by the server computer, the first phase of the multiphase advertisement and the second phase of the multiphase advertisement.

11. A non-transitory computer readable storage medium comprising computer instructions for execution by a processor, the computer instructions comprising:
    transmitting, to a client computer for display, a first phase of a multiphase advertisement, the first phase including a first graphical interface of a first dimension;
    receiving, from the client computer, a selection of the first phase of the multiphase advertisement, the receiving of the selection comprising detecting a cursor controlled by the client computer being moved over the first phase of the multiphase advertisement without the need for a cursor activation;
    in response to the detecting of the cursor being moved over the first phase of the multiphase advertisement, transmitting, to the client computer for display, a second phase of the multiphase advertisement, the second phase including a second graphical interface of a second dimension that is different from the first dimension of the first phase, the second graphical interface comprising an advertisement for a movie, the second graphical interface comprising an embedded streaming media component that provides a user with an ability to view video clips, the embedded streaming media component automatically playing upon the display of the second phase of the multiphase advertisement,
    the second graphical interface of the second phase including a toolbar, the toolbar enabling the user to access additional information related to the second graphical interface, the additional information comprising showtimes of the movie.

12. The non-transitory computer readable storage medium of claim 11, wherein the toolbar provides the user access to summary information concerning the movie.

13. The non-transitory computer readable storage medium of claim 11, wherein the toolbar provides the user an ability to purchase tickets to the movie.

14. The non-transitory computer readable storage medium of claim 11, wherein the first phase and the second phase of the multiphase advertisement relate to a particular consumer good.

15. The non-transitory computer readable storage medium of claim 14, wherein the toolbar provides the user with functionality to purchase the consumer good.

16. The non-transitory computer readable storage medium of claim 11, wherein the second graphical interface of the second phase comprises a streaming media component.

17. The non-transitory computer readable storage medium of claim 16, wherein the streaming media component is selected from a group of streaming media types consisting of streaming video and streaming audio.

18. The non-transitory computer readable storage medium of claim 11, wherein the toolbar includes at least a link to an interactive form for contacting a second user about a subject of the multiphase advertisement.

19. The non-transitory computer readable storage medium of claim 11, further comprising generating, by the server computer, the first phase of the multiphase advertisement and the second phase of the multiphase advertisement.

20. A computing device comprising:
    a processor;
    a storage medium for tangibly storing thereon program logic for execution by the processor, the program logic comprising:

logic executed by the processor for transmitting, to a client computer for display, a first phase of a multiphase advertisement, the first phase including a first graphical interface of a first dimension;

logic executed by the processor for receiving, from the client computer, a selection of the first phase of the multiphase advertisement, the receiving of the selection comprising detecting a cursor controlled by the client computer being moved over the first phase of the multiphase advertisement without the need for a cursor activation;

logic executed by the processor for, in response to the detecting of the cursor being moved over the first phase of the multiphase advertisement, transmitting, to the client computer for display, a second phase of the multiphase advertisement, the second phase including a second graphical interface of a second dimension that is different from the first dimension of the first phase, the second graphical interface comprising an advertisement for a movie, the second graphical interface comprising an embedded streaming media component that provides a user with an ability to view video clips, the embedded streaming media component automatically playing upon the display of the second phase of the multiphase advertisement, the second graphical interface of the second phase including a toolbar, the toolbar enabling a user to access additional information related to the second graphical interface, the additional information comprising showtimes of the movie.

* * * * *